United States Patent [19]

Quarles et al.

[11] Patent Number: 5,996,001
[45] Date of Patent: Nov. 30, 1999

[54] HIGH AVAILABILITY ON-LINE TRANSACTION PROCESSING SYSTEM

[76] Inventors: Philip Quarles; Stephanie Quarles, both of 5 Kew Ct., Northport, N.Y. 11768

[21] Appl. No.: 08/799,644

[22] Filed: Feb. 10, 1997

Related U.S. Application Data

[63] Continuation of application No. 08/313,437, Sep. 27, 1994, abandoned.

[51] Int. Cl.$^6$ ................................................. G06F 9/44
[52] U.S. Cl. ..................... 709/203; 709/101; 709/200; 709/208; 709/223; 709/249; 714/4; 714/43; 714/56; 714/712; 714/717
[58] Field of Search ........................... 395/200.3, 200.53, 395/200.57, 200.79, 200.81, 200.33; 709/200, 223, 249, 101, 203, 208; 714/4, 43, 56, 712, 717

[56] References Cited

U.S. PATENT DOCUMENTS

| | | | |
|---|---|---|---|
| 4,607,365 | 8/1986 | Greig et al. | 395/182.02 |
| 4,831,518 | 5/1989 | Yu et al. | 395/650 |
| 5,005,122 | 4/1991 | Griffin et al. | 364/200 |
| 5,367,668 | 11/1994 | Pandolfo | 395/182.1 |
| 5,404,508 | 4/1995 | Konrad et al. | 395/600 |
| 5,455,932 | 10/1995 | Major et al. | 395/489 |
| 5,473,771 | 12/1995 | Burd et al. | 395/182.02 |
| 5,495,607 | 2/1996 | Pisello et al. | 395/600 |
| 5,692,120 | 11/1997 | Forman et al. | 395/182.08 |

*Primary Examiner*—Meng-Ai T. An
*Assistant Examiner*—Dzung C Nguyen
*Attorney, Agent, or Firm*—Collard & Roe, PC

[57] ABSTRACT

A high availability on-line transaction processing (OLTP) system utilizes both hardware and software. Geographically separated primary (live) and backup (shadow) communications servers link live and shadow OLTP systems to geographically separated live and shadow Wide Area Networks and remote client computers. The remote client computers communicate with the live and shadow OLTP systems through their respective live and shadow WANs and communications servers. The live OLTP system sends "keep-alive" messages to the shadow system via the dedicated circuits on a frequent basis. If the shadow OLTP system does not receive a keep-alive message from the live system within a designated time interval, it sends "probe messages" to the live communications servers and live OLTP system, via the shadow WAN, client computers and live WAN to determine their status. If the live communications servers respond to the probe message(s) but the live OLTP system does not, the shadow OLTP system deduces that the live OLTP system failed and automatically takes over the role of the live system without operator intervention.

2 Claims, 12 Drawing Sheets

HIGH AVAILABILITY ON-LINE TRANSACTION PROCESSING SYSTEM

This is a continuation of application(s) Ser. No. 08/313,437 filed on Sep. 27. 1994, now abandoned.

BACKGROUND OF THE INVENTION

1. Field of the Invention

The present invention relates to computer network systems. More particularly, it relates to high availability on-line transaction processing systems.

2. The Prior Art

Alsberg and Day [1976] introduced the idea of "System Pairs" to protect against simultaneous faults through duplication and geographical separation of on-line systems. They reasoned that weather, power failures, computer operators and sabotage were unlikely to fault both systems at the same time. A fundamental problem with System Pairs is that when the backup system stops receiving data from the primary system, there is no automatic way to determine if the primary system failed, or if the circuit(s) connecting the primary and backup systems failed or both.

Gray and Reuter (Transaction Processing: Concepts and Techniques, 1993) proposed that the computer operators at the primary and backup sites consult one another to determine if the primary system failed. If it did, the operator at the backup site instructs the backup to takeover the role of the primary system. While the operators sort out the problem, the system may be down. If the operators cannot communicate for any reason, for example, fire, flood or earthquake, the system may be down for a longer period of time.

Digital Equipment Corp. markets a "Disaster-Tolerant System," which requires computer operator action or an additional computer at a third site to cast the deciding "vote" if the primary and backup systems cannot communicate. In addition, the primary and backup sites must be located within 24.8 miles of each other. This does not provide enough geographical separation to protect both sites against the effects of an earthquake, hurricane or flood.

Another important issue effecting availability is how the client computers communicate with the primary and backup systems. The system shown by Gray and Reuter depicts the client computers with separate connections to the primary and backup systems. The client computer sends all its messages to the primary system while it's operable. If the primary system fails, the backup system takes over and the client communicates with the backup system via its connection to the backup system. Unfortunately, if the circuit to the primary system fails, and the primary system is operable, the client is denied service.

SUMMARY OF THE INVENTION

The present invention provides a geographically separated On-Line Transaction Processing System (OLTP) system whereby the availability of the system is significantly increased due to geographically separated live and shadow systems; an automated process of switching from the live and the shadow systems in the event the live system fails; geographically separated wide area networks (WAN); and client computers which send and receive duplicate input/output messages to/from the live system via the live and shadow WANs.

The invention comprises a hardware and software system consisting of live and shadow OLTP systems, live and shadow backbone network, live and shadow communications servers, live and shadow wide area networks and one or more client computers connected to the live and shadow WANs.

To increase availability, the client computers transmit duplicate streams of input messages to the live system. The live system receives one stream via the live WAN and live communication server and the second stream via the shadow WAN, shadow communications server, shadow system and the live/shadow backbone network (hereafter called the backbone network). The live system detects and discards duplicate input messages by comparing sequence numbers contained in the input messages. The live system processes the input stream and creates output messages. To further increase availability, the live system sends duplicate copies of each output message to the client computers via the live and shadow networks (i.e., live and shadow communications servers and WANs.) The client computers then detect and discard duplicate output messages received by comparing the sequence number returned in each output message.

To enable the shadow system to quickly take over if the live system fails, the live system sends a copy of every input message to the shadow system via the backbone network. The shadow system process the input messages, but does not send output messages to the client computers while it is "shadowing" the live system.

The live system informs the shadow system that it is operable, by sending "keep-alive" messages to it via the backbone network on a frequent basis. If the shadow system stops receiving the keep-alive messages, it sends probe messages to the live OLTP system via the shadow network, client computers and live network to determine if it failed or backbone network failed. If the live OLTP system failed it will not return a probe response messages to the shadow OLTP system. The shadow OLTP deduces that the live OLTP system failed and takes over the role of the live system and starts sending output messages to the client computers. If the live OLTP system did not fail it will return an "I'm Alive" probe response message to the shadow OLTP system via the live network, client computer and shadow network. The shadow OLTP system deduces that the backbone network failed and shuts itself down because it cannot shadow the live OLTP system when the backbone network fails.

Since the shadow OLTP system can distinguish between the failure of the live OLTP system and the failure of the backbone network, the shadow system can automatically transition from "shadowing" the live system to "on-line" mode without operator intervention. This automates the process of switching over when the live system fails and significantly improves the availability of the geographically separated OLTP systems.

It is therefore an object of the present invention to provide a high availability on-line transaction processing system that does not require operator intervention when the live system fails.

It is another object of the invention to improve the availability of geographically separated OLTP systems.

A further object of the invention is to provide a live and shadow OLTP system which functions more reliably and more efficiently than other OLTP systems.

It is yet another object of the present invention to improve the availability of the network to client computers.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
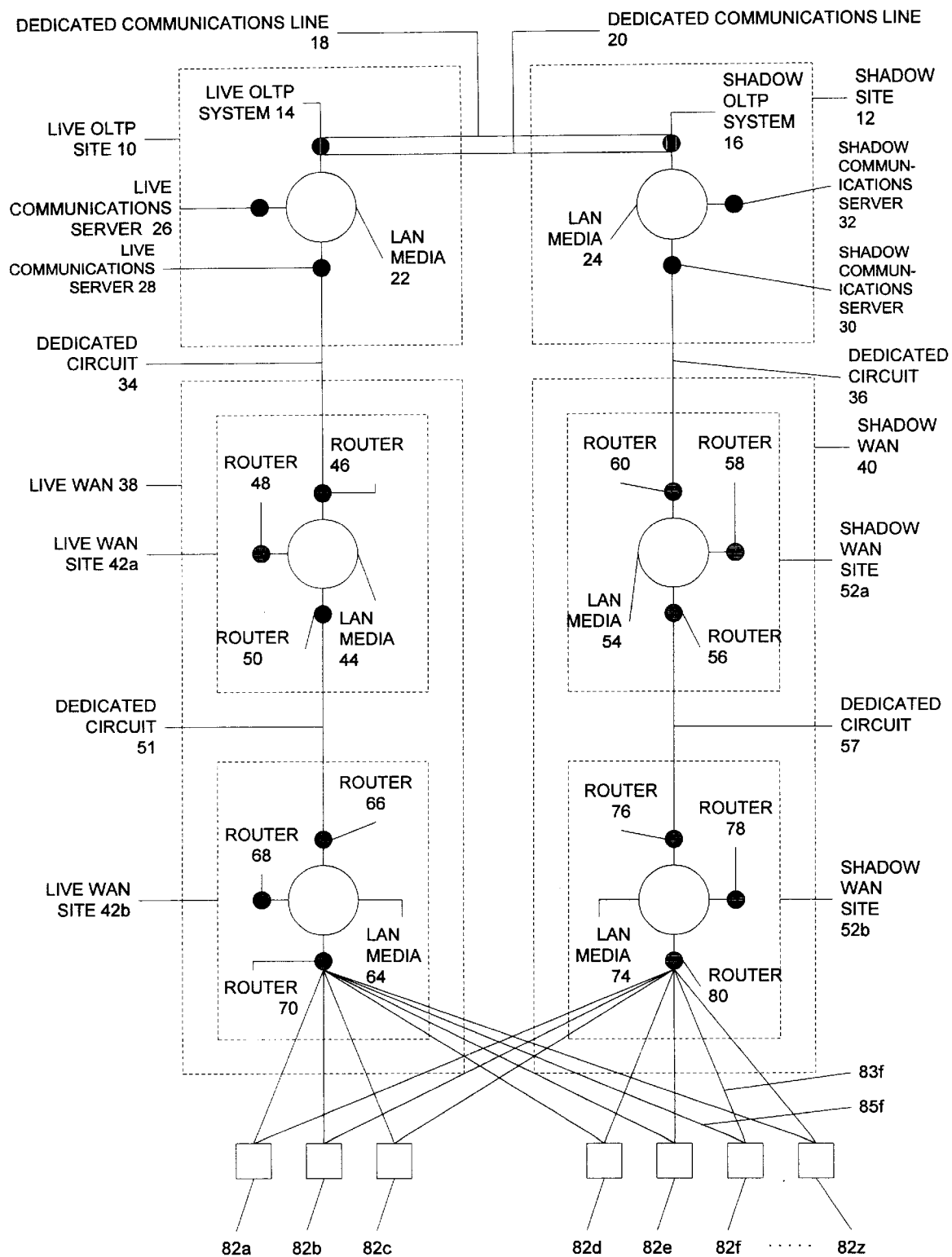
FIG. 1 is a block diagram of a first embodiment of the network architecture of the invention.

Turning now in detail to the drawings, FIG. 1 shows the network architecture of a first embodiment of the invention. A live on-line transaction processing (OLTP) site 10 and a shadow OLTP site 12 handle the processing of input and output messages and control the flow of those messages along the respective networks. The live OLTP site 10 is comprised of a live OLTP system 14 and a plurality of live communication servers 26 and 28. The live communication servers 26 and 28 are computers that relay data between the client computers 82a–82z and the live OLTP system 14. A pair of dedicated communication lines 18 and 20 connect the live OLTP system 14 with a shadow OLTP system 16. The communication lines 18 and 20 make up the backbone network of the system. The live communication servers 26 and 28 are connected to the live OLTP system 14 by local area network (LAN) media 22, of any suitable known type.

The live OLTP site 10 is connected to a live wide area network (WAN) 38 comprised of one or more live WANs, such as, for example, 42a and 42b. Live communication server 26 can be used to connect even more live WANs (not shown in the FIGS.) to the live OLTP system 14. A dedicated live communication circuit 34 connects the live communication server 28 to the first live WAN site 42a, within live WAN 38, via router 46. The first live WAN site 42a contains a plurality of routers 46, 48 and 50 connected by a LAN media 44, of any suitable known type. Routers 46, 48 and 50 are devices used to interconnect two or more LANs together. For example, router 46 in live WAN site 42a interconnects the LAN at live WAN site 42a with the LAN at the live OLTP site 10.

Router 50 is connected to a second live WAN site 42b via a dedicated live communication circuit 51. The live circuit 51 is connected to a router 66 within live WAN site 42b. Live WAN site 42b contains a plurality of routers 66, 68 and 70 connected by a LAN media 64, of any suitable known type. Router 70 interconnects a plurality of client computers 82a–82z to the live communication server 28 via the live WAN 38.

The shadow on-line transaction processing (OLTP) site 12 contains a shadow OLTP system 16 coupled to the live OLTP system 14 via the backbone network (i.e., dedicated communication lines 18 and 20). The shadow OLTP system 16 is connected to a plurality of shadow communication servers 30 and 32 via LAN media 24, of any suitable known type. A dedicated shadow communication circuit 36 connects the shadow communication server 30 to a first shadow WAN site 52a within shadow WAN 40. Shadow communication server 32 can be used to connect even more shadow WANs (not shown in the FIGS.) to the shadow OLTP system 16. The first shadow WAN site 52a has a plurality of routers 56, 58 and 60 connected by LAN media 54, of any suitable known type. Router 58, in shadow WAN site 52a, could be used to interconnect another shadow WAN (not shown in the FIGS.) to the system, or could be used to interconnect a network of client computers (not shown in the FIGS.) to the system. Router 56 connects a second shadow WAN site 52b to the shadow OLTP system 16 via a dedicated shadow communication circuit 57. Circuit 57 is connected to router 76 within the second shadow WAN site 52b. Shadow WAN site 52b has a plurality of routers 76, 78 and 80 connected by LAN media 74, of any suitable known type. Router 80 interconnects the same plurality of client computers 82a–82z to the shadow communications server 30 via the shadow WAN 40. Each client computer 82a–82z is connected to both the live and shadow communications servers 28 and 30, respectively, via the live and shadow WANs 38 and 40, respectively.

Live WAN sites 42a, 42b and shadow WAN sites 52a and 52b are geographically separated from each other and from the live and shadow OLTP sites 10 and 12, respectively. Furthermore, the live and shadow OLTP sites 10 and 12, respectively, are also geographically separated from each other.

Figure 2:
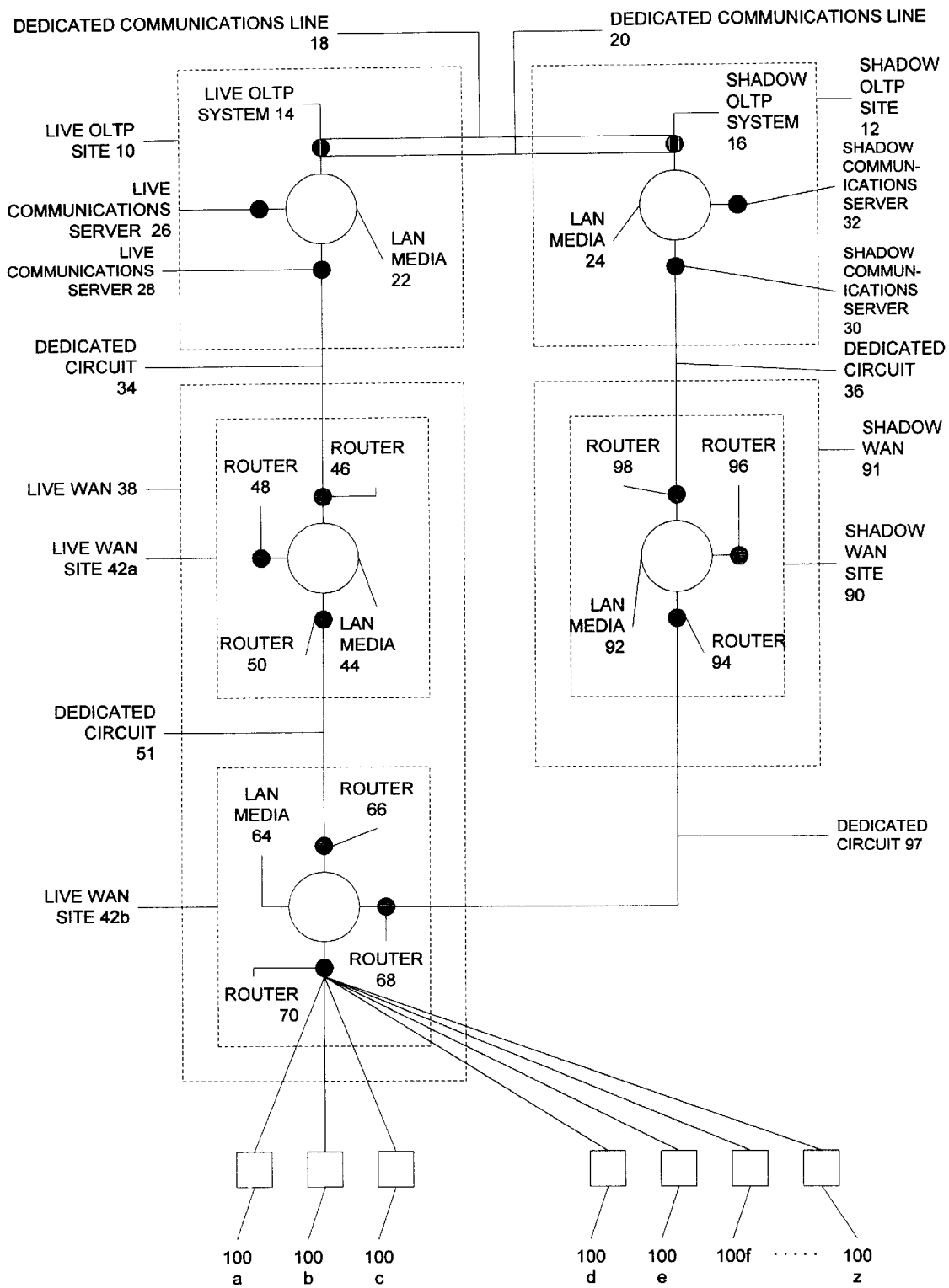
FIG. 2 is a block diagram of a second embodiment of the network architecture of the invention.

FIG. 2 shows a second embodiment of the invention using a single circuit to the client computers. This is a cost reduced variant of the high availability network architecture shown in FIG. 1. The network architecture of the live OLTP site 10 and the live WAN 38 is the same as shown in FIG. 1. The shadow OLTP site 12 is also the same as disclosed in FIG. 1. A new shadow WAN site 90 is shown having a plurality of routers 94, 96 and 98 connected by LAN media 92. Shadow WAN site 90 is connected to the second live WAN site 42b via a dedicated shadow communication circuit 97. Circuit 97 connects router 94 of shadow WAN site 90 to router 68 of the live WAN site 42b. A plurality of client computers 100a–100z are connected to router 70 in live WAN site 42b.

There is a single telecommunications circuit connecting the client computers 100a–100z to one WAN site (42b), as opposed to two. The client computers 100a–100z send and receive input and output messages to their live and shadow systems, 14 and 16, respectively, via the single telecommunications circuit to router 70. Router 70, of live WAN 42b, relays messages to and from the live and shadow communication servers 28 and 30, respectively, through live and shadow WAN'S 38 and 91, respectively. This single circuit embodiment between the client computers and the WAN sites reduces the availability of the system from the client computer's perspective, because the single telecommunications circuit and the connecting WAN site are single points of failure.

Figure 3:
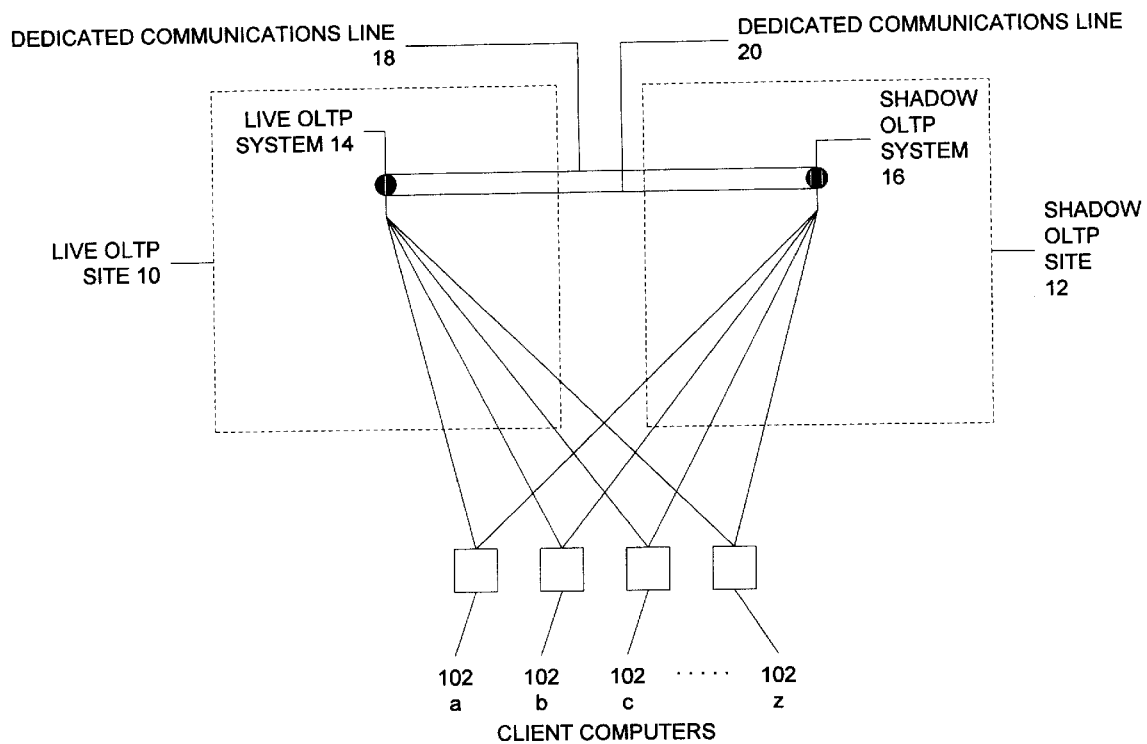
FIG. 3 is a block diagram of a third embodiment of the network architecture of the invention.

FIG. 3 shows a third embodiment of the network architecture of the invention. In this embodiment, the client computers 102a–102z are directly connected to both the live and shadow OLTP systems 14 and 16, respectively. This architecture is suitable for a small population of client computers.

Figure 4:
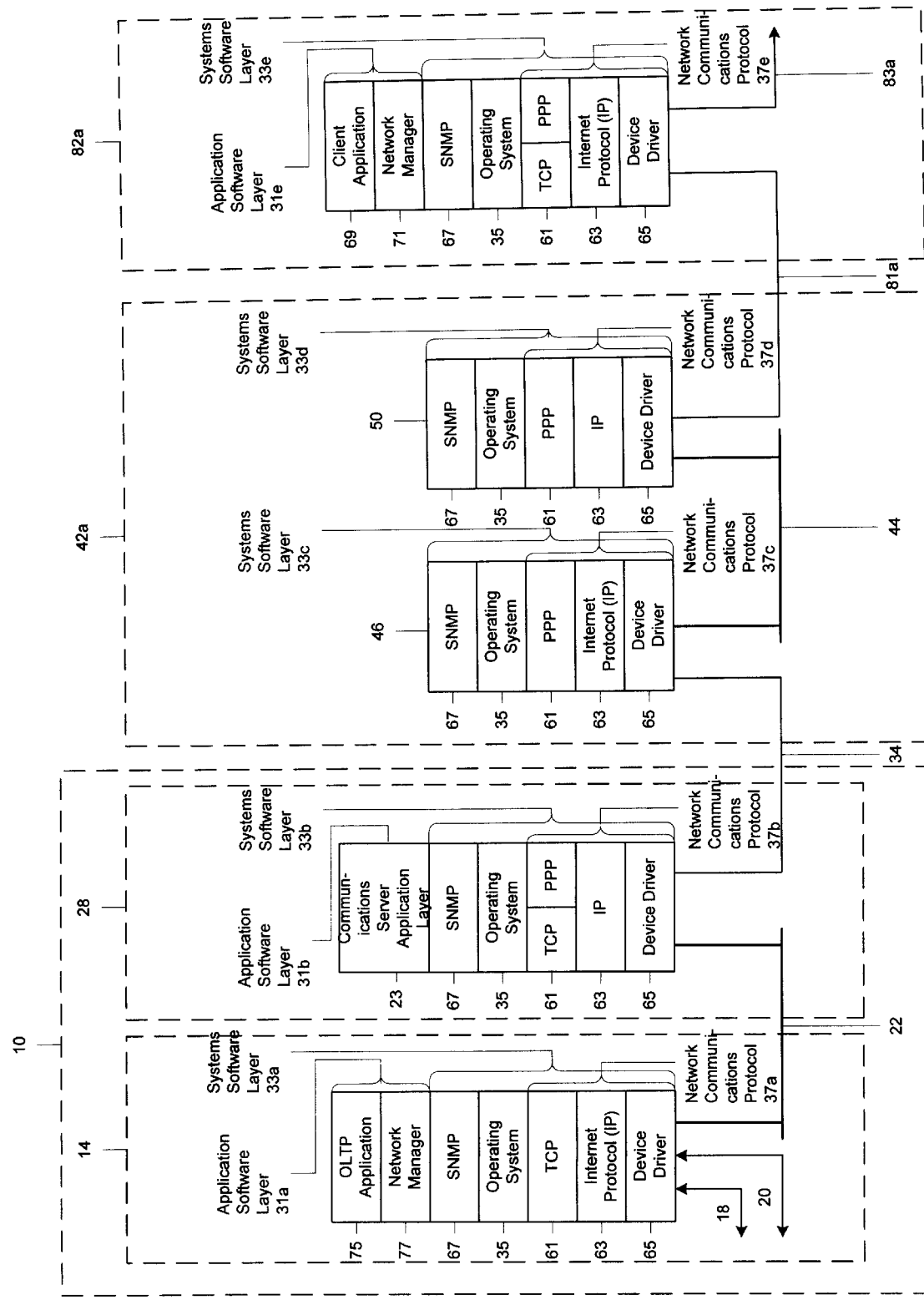
FIG. 4 is a detailed block diagram of the network software architecture of the invention.

FIG. 4 shows a detailed block diagram of the software architecture of the live side of the high availability OLTP system. The live WAN sites 42b–42z and the shadow side have been removed from the diagram for simplification. The OLTP systems 14 and 16, all communications servers, and all client computers each contain both a system software layer 33 and an application software layer 31. The live and shadow WAN sites 42a–42z and 52a–52z, respectively, contain only the system software layer 33.

The system software layer 33a–e is comprised of SNMP 67, the operating system 35 and the network communications protocol 37a–e. This layer handles the underlying hardware and network operations and thereby frees application software layer 31a–b so it may provide services to the end users. The operating system 35 is software that directly interacts with the hardware and provides common services to application subsystems, such as, for example, passing data between the hardware and programs, allocation of system resources(such as memory and CPU cycles) and scheduling programs for execution. The preferred operating systems for the invention are UNIX and Microsoft Windows NT.

The network communications protocol 37 is software that allows two or more computers to communicate via transmission media using a data communications protocol. The preferred network communications protocol suite for this invention is TCP/IP. The preferred network applications programming interface to TCP/IP is the transport layer interface (TLI). The variant is the "Berkely Software Distribution" socket interface.

The network communications protocol 37 that is, TCP/IP, is normally considered to be a 3 layer system. The first layer is the transport (TCP, UDP) layer 61. The second layer is the network (IP, ICMP, IGMP) layer 63 and the third is the link layer 65 (which supports a device driver that supports either the ethernet protocol, token ring protocol, serial line protocol, etc.). Each of the three layers has different responsibilities within the system. Transport layer 61 provides a flow of data between two hosts, for application software layer 31. There are two different transport protocols in the TCP/IP protocol suite. These are, TCP (transmission control protocol) and UDP (user data protocol). The present invention uses transmission control protocol (TCP). TCP provides a reliable flow of data between two hosts by handling such things as dividing the data passed to it from the application layer into appropriate sized pieces for the network layer to handle, acknowledging received packets of data, setting time-outs to make certain the other end acknowledges packets that are sent, etc. Due to this handling of the data flow by the transport layer, the application software layer 31 is free to handle other aspects of processing information.

The Internet protocol (IP), internet control message protocol (ICMP), and internet group management protocol (IGMP) provide the network layer in the TCP/IP protocol suite. The network layer 63, of the network communications protocol 37, handles the movement of data packets around the network; for example, routing of data packets occurs in this layer.

The link layer 65, of the network communications protocol 37, sometimes referred to as the data-link layer, normally includes the device driver in the operating system and the corresponding network interface card in the computer. Together, they handle all the hardware details of physically interfacing the computer to the transmission (LAN) media. Point-to-point protocol (PPP) is one of several link level protocols that can be used to link client computers to routers and routers to communication servers using telephone lines. LAN bridges provide an alternate way to link routers and communication servers together.

Included in system software layer 33 is the Simple Network Management Protocol (SNMP) software 67. SNMP software 67 is software that enables the network manager, located in both the live and shadow OLTP systems 14 and 16, respectively, to isolate faults and measure the performance of the network.

The client computer application software layer 31e contains the client application program 69 and the client network manager software 71. Client application program 69 provides a service to the client's end-user. It is not involved with the transmission of messages between it and the OLTP system. That is handled by the client network manager software 71.

The client computer network manager is responsible for establishing connections with the live and shadow communications servers 28 and 30 respectively, sending and receiving messages, relaying probe messages (described below) discarding duplicate messages and terminating the connections with the live and shadow communications servers.

The shadow OLTP system periodically sends probe messages to the live communications servers via the shadow network, client computers and live WAN to determine which are operable. Operable live communications servers return probe response messages to the shadow OLTP system via the same path.

Figure 5:
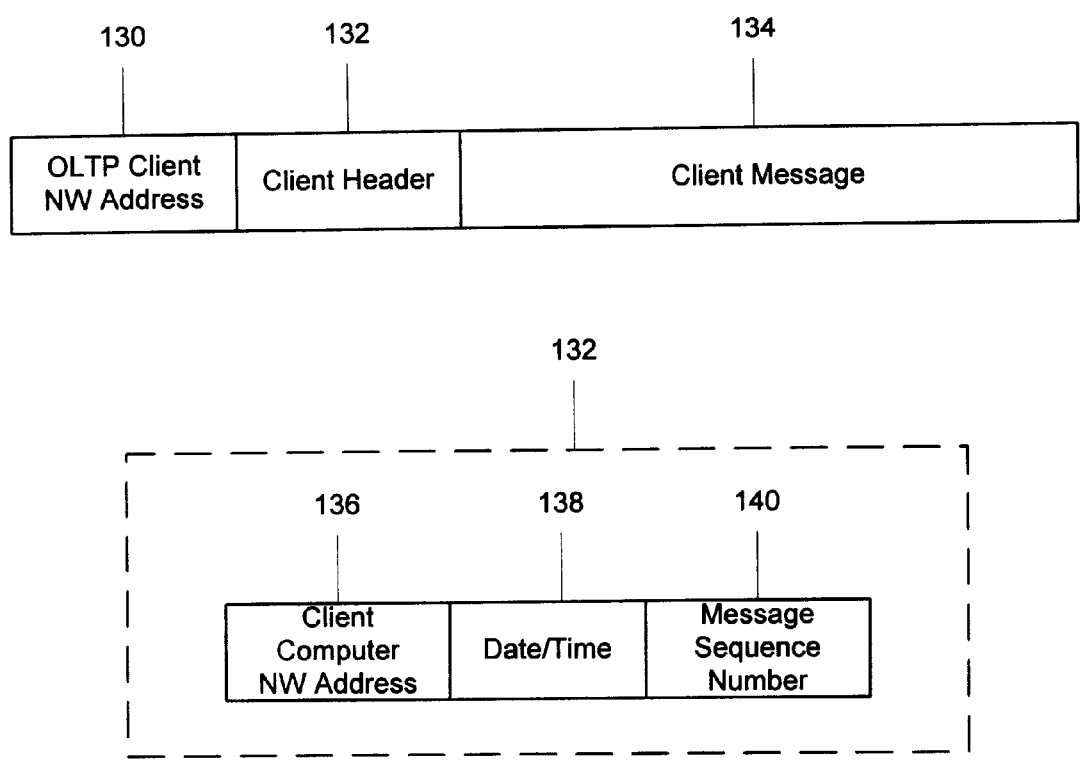
FIG. 5 is a block diagram of the client message layout.

The client computer network manager adds a client header to each input message it receives from the client computer application program. The purpose of the client header is to enable the live and shadow OLTP systems to uniquely identify input messages from client computers. The client header contains [FIG. 5], the client computer network address, date/time and a message sequence number.

Figure 6:
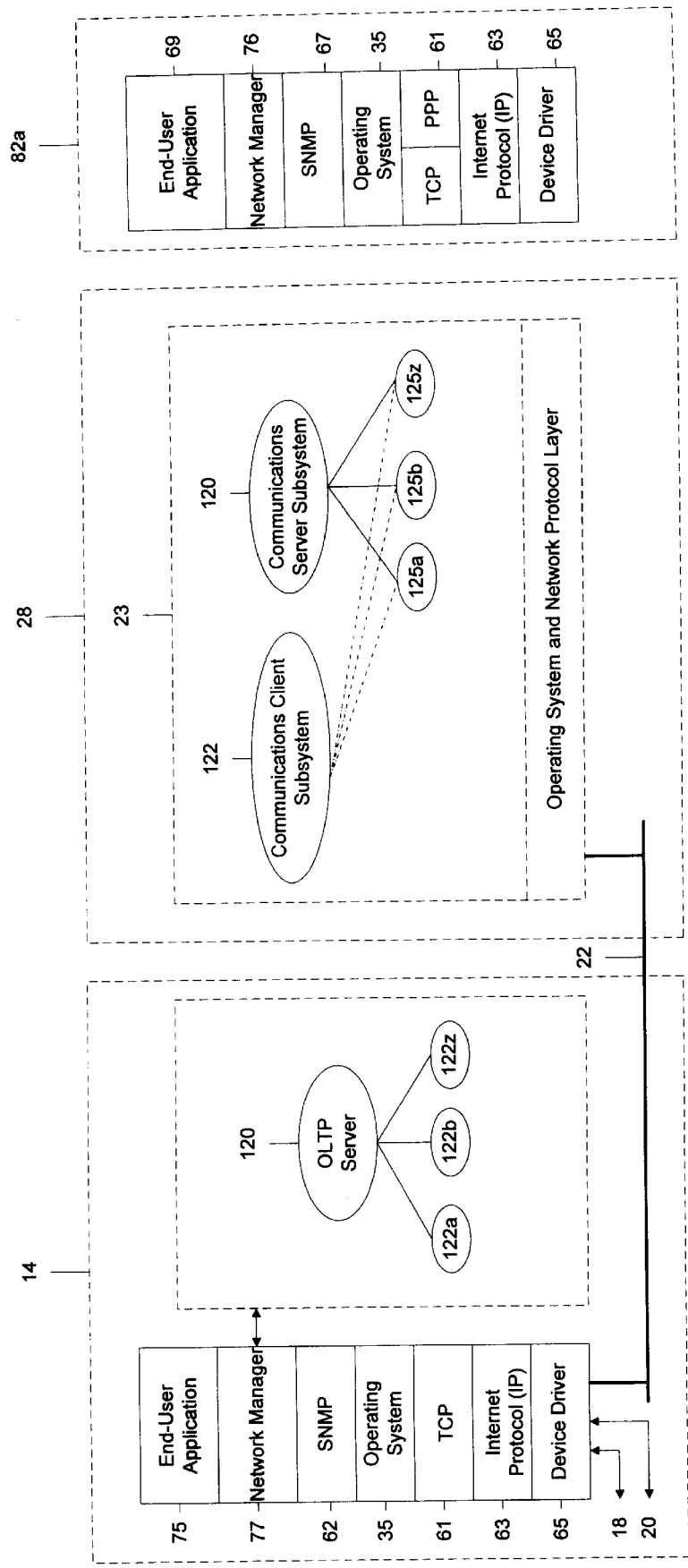
FIG. 6 is a block diagram of the message routing of the invention.

Referring to [FIG. 4], the applications software layer 31b within the live communication server contains the communications application 23 which relays messages between client computers and their respective OLTP systems. Referring to [FIG 6], each communications application 23 contains two major software subsystems. One is the communications server subsystem 120 which communicates with the client computers and the other is the communications client subsystem 122 which communicates with the OLTP system.

Client computers 82a–82z must first establish a connection with the communications server subsystem 120 within the live and shadow communications servers 28 and 30 to send a message to the OLTP systems. To establish a connection, the client computer sends a connection request to communications server subsystem 120. When it arrives, communications server subsystem 120 starts a new server process 125a–125z to handle that particular client computer's request. This may involve creating a new process, task or thread, depending on what the underlying operating system supports. Upon establishing the connection, communications server subsystem 120 waits for an input message. When it arrives, communications server subsystem 120 relays the input message, via interprocess communications 124a–124z, to communications client subsystem 122, then server subsystem 120 stands by and waits for an output message from the communications client subsystem 122.

Communications client subsystem 122 communicates with the respective OLTP system using the connection-oriented communications protocol (TCP/IP). To communicate with the OLTP system the communications client subsystem 122 first establishes a connection with the OLTP system. After connecting, subsystem 122 awaits an input message from a server process 125a–125z created by server subsystem 120. Once received, it relays the input message to the OLTP system. After the OLTP system processes the input message it produces an output message. The communications client subsystem 122 waits for the output message and upon receipt thereof, relays it directly to the respective client computer through that client's server process 125a–125z.

Communications client subsystem 122 adds its network address to each input message it sends to the OLTP system. When the OLTP system creates an output message destined for a client computer, it extracts the address of the communications client subsystem and the client header from the input message and appends them to the output message and then it directs the output message to the communications client subsystem. Communications client subsystem 122 relays the output message by interprocess communication 124a–z to the respective communications server subsystem process 125a–z. Communications server process 125a–125z sends the output message to the client computer network manager which completes the cycle.

The communications server processes 125a–125z created by communications server subsystem 120 within each communications server, inspects each input message to see if it is a probe message. If it is, it sends a probe response message to the client computer network manager indicating that it is operable.

Referring to FIG. 4, each OLTP system (i.e., live and shadow) has an OLTP application software layer 31a. FIG. 4 only shows the live side for simplification purposes. The OLTP application software layer 31a consists of two separate software elements; an OLTP application 75 and an OLTP network manager 77.

The OLTP application software 75 provides a service to the client computer end user. It is not involved with the transmission of messages between it and the OLTP system.

The OLTP network manager program 77 hides all the details of connection establishment, data transmission, responding to probe messages, and connection termination from the OLTP application software. OLTP network manager 77 is responsible for establishing connections with its communications client subsystems, sending and receiving messages to and from its communication client subsystems.

The OLTP network manager 77 communicates with the respective communication client subsystems using connection-oriented communications protocol (TCP/IP). In order to communicate with the communication client subsystems, the OLTP network manager 77 first waits for a connection request from the communication client subsystem 122. Once a connection request is received, network manager 77 starts a new server process 122a–122z [FIG. 6]. This may involve creating a new process, task or thread, depending on what the underlying operating system supports. How this step is performed, depends on the operating system being utilized. After establishing the connection, network manager 77 awaits an input message from the communication client subsystem 122. When it receives the input message, it logs it then relays it via interprocess communication to the OLTP application program 75 and then the network manager awaits the output message from OLTP application program 75. When the network manager 77 receives the output message, it directs it to the respective client computer.

Figure 7:
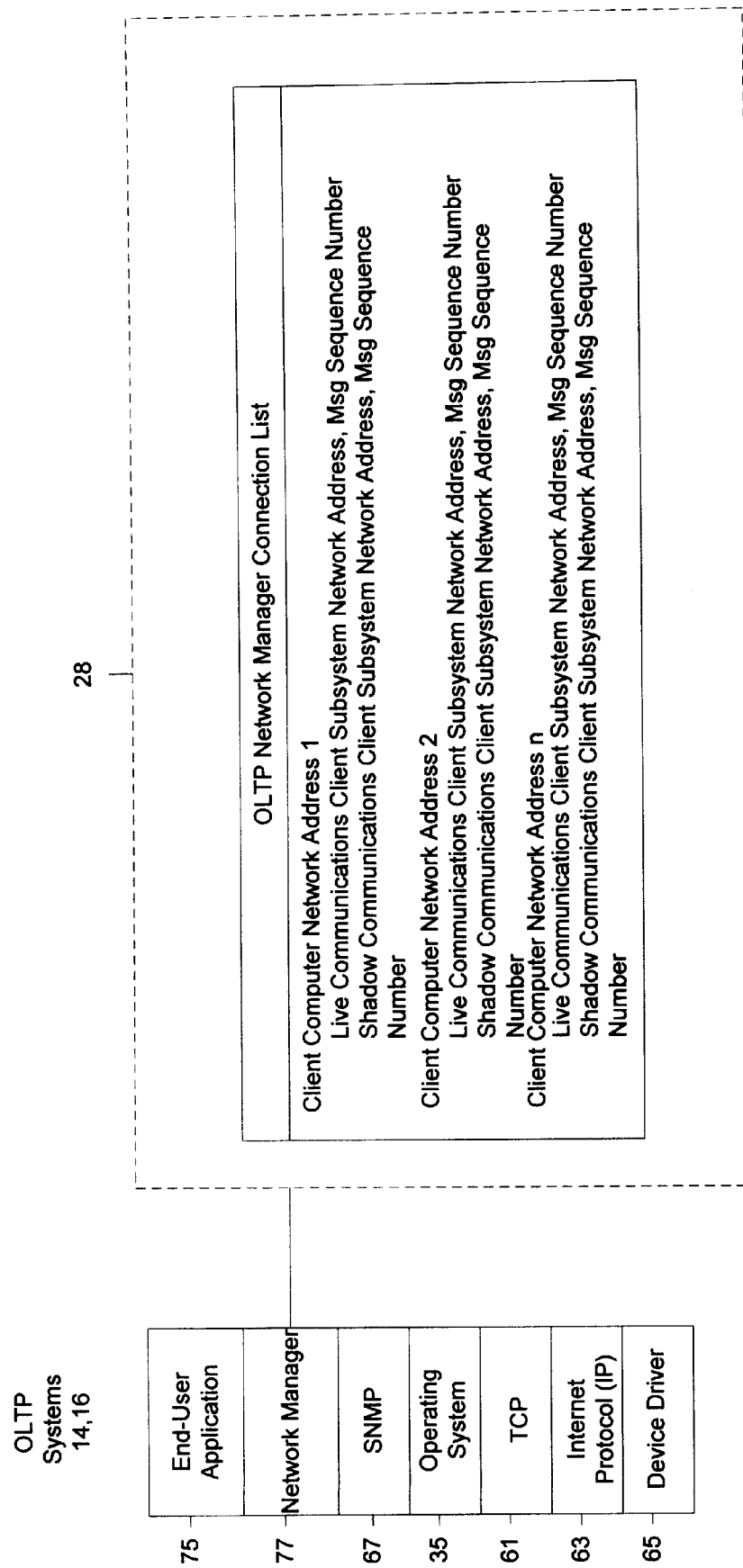
FIG. 7 is an example of a connection list within a an OLTP system.

The OLTP network managers exchange information via backbone network. The live OLTP system sends two copies of each input message it receives from a client computer to the shadow OLTP system via circuits 18 and 20 (one message over each circuit) of the backbone network. The shadow OLTP application program processes the input messages but does not send output messages to the client computers while it is "shadowing" the live system. The shadow OLTP network manager sends two copies of every input message it receives from a client computer to the live OLTP system via circuits 18 and 20 (one msg per circuit) of the backbone network. The live and shadow network managers are responsible for detecting and discarding duplicate input messages. To do this, the live and shadow OLTP network managers maintain a client computer connection list [FIG 7]. When an OLTP network manager receives an input message, it searches its connection list for a matching client computer network address. If it does not find one, it creates an entry in its connection list for that client computer. Referring to [FIG 7], an entry contains the address of the client computer, the address of the communications client subsystem and client computer message sequence number. After the network manager creates an entry, it passes the input message to the OLTP application program 75. If it does find one, it compares the communications client computer network address and client computer message sequence number in the input message to the corresponding fields in the connection list. If they are the same, it discards the input message because it is a duplicate. If they are not the same, the network manager checks to see if the input message has the next expected sequence number then the respective entry in the connection list. If so it updates the respective client computer message sequence number field in the connection list and passes the input message to the OLTP application program 75.

When a client computer disconnects, the communications server subsystem process 125a–z creates a client computer disconnect message. The message contains the network address of the client computer and a code indicating that the client computer disconnected. The communications server system process 125a–z passes the disconnect message to the communications client subsystem 122 which appends its network address to the disconnect message and sends it to the OLTP network manager. When the OLTP network manager receives the disconnect message it removes that client computer from its connection list, sends a disconnect acknowledgment message to the respective communications client subsystem and terminates the respective OLTP server process 122a–122z. When the communications client subsystem receives the disconnect acknowledgment message, it passes it to the communications server subsystem which terminates the corresponding communication server process 125a–125z to complete the cycle of removing the supporting processes from the communications servers and OLTP systems.

When the live OLTP network manager receives an output message from the live OLTP application software 75, it searches the connection list to see if that client is connected to a live communications server. If so, it directs the output message to that live communications client subsystem. In any event it sends two copies of the output message to the shadow system via circuits 18 and 20 (one msg per circuit)

of the backbone network. When the shadow OLTP network manager receives a message from the live OLTP network manager via the backbone network, it searches its connection list to see if the output message is a duplicate. If not, it updates its connection list, then sends the output message to the respective shadow communications client subsystem for delivery to the client computer.

The live OLTP network manager sends keep-alive messages via the backbone network to the shadow OLTP network manager on a periodic basis. The shadow OLTP network manager monitors the incoming messages. If the shadow OLTP system does not receive a keep-alive message from the backbone network within the expected interval, it sends probe messages to the live communications servers and the live OLTP system via the shadow network and client computers to determine their status. If the shadow OLTP system does not receive an "I'm alive" probe response message from the live OLTP system it deduces that it failed and puts itself on-line.

The shadow system network manager program (not shown in the FIGS.) dynamically derives how many live communications servers it can communicate with via the shadow WAN and client computers by analyzing its connection list each time a client computer connects or disconnects from the live and shadow network. It uses the connection list to compute a live communications server reachability index, which is simply a count of the number client computers it can reach which are connected to the live communication servers.

If the shadow system backbone keep-alive timer expires and the shadow network manager deduces that it cannot communicate with at least one live communications server, the shadow system network manager informs the shadow system computer operator that it cannot determine the status of the live system because it cannot reach it, and it shuts itself down.

Figure 8:
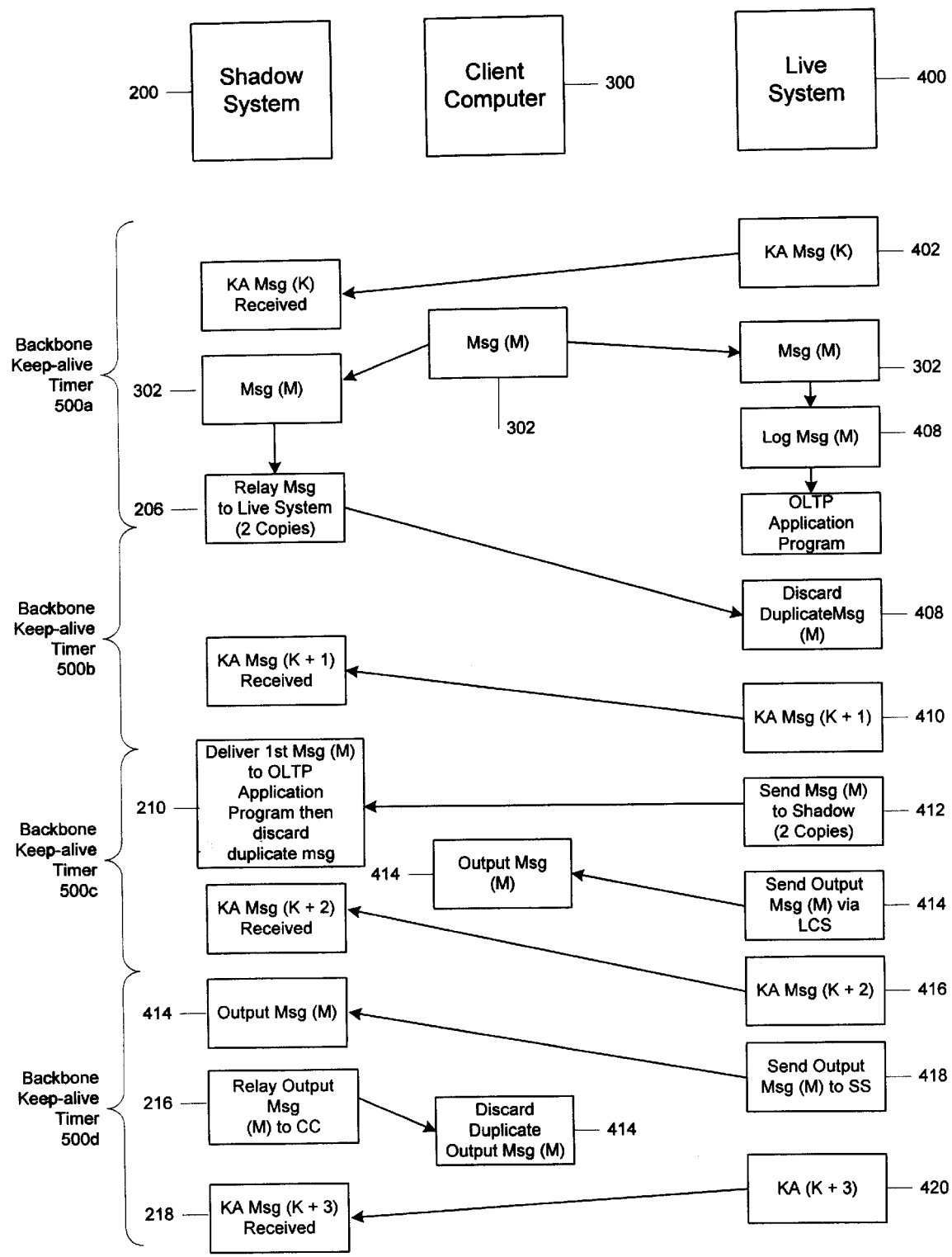
FIG. 8 is a message protocol diagram of the system of the invention during normal operation.

FIG. 8 shows the message flow of the high availability OLTP system during normal operation. A client computer 300 starts the process by initiating an input message 302 after connecting to the system. The client computer's network manager sends a copy of input message 302 to the live and shadow OLTP systems 400 and 200, respectively, via the live and shadow communication servers (not shown). The live OLTP system 400 network manager checks to see if the message received 302 is a duplicate message. Since it is not a duplicate message, the live network manager logs the input message and delivers logged message 406 to the live OLTP application program.

The live OLTP network manager sends two copies 412 of the input message 302 to the shadow system network manager via the backbone network. The shadow system network manager checks it's connection list, determines that the first copy is not a duplicate, and delivers input message 302 to the shadow OLTP system application program 210, thereby allowing the shadow system 200 to "shadow" live system 400. The shadow network manager will detect that the second copy of the input message is a duplicate and will discard it.

In the meantime, the network manager in the shadow system 200 receives the client computer input message 302. The shadow system network manager queues the input message (for recovery), and sends two copies 206 of said input message to the live system network manager via the backbone network. The live system network manager checks to see if the messages are duplicate messages, and discards them (408) since they are duplicates.

The live system application program will create an output message 414 and send it to the client computer 300 via the live system network manager and the live communication server. The client computer's network manager checks to see if the output message 414 is a duplicate and since it is not, delivers said output message to the client computer's application program. Meanwhile, the live system network manager sends duplicate copies 418 of the output message 414 to the shadow system network manager via the backbone network. The shadow network manager determines that the first output message copy 414 is not a duplicate, removes the corresponding input message 302 from its recovery queue and then relays (216) said output message to the client computer network manager via the shadow communication server. The client computer network manager determines that output message 414 is a duplicate and discards it. When the shadow network manager receives the second copy of the output message, it detects that it is a duplicate and discards it (not shown in the FIGS.).

During the course of operation, the shadow system 200 maintains a backbone keep-alive timer 500a–500d. The backbone keep-alive timer has a predetermined timeout period and provides shadow system 200 with a way to monitor the live system 400. Live system 400 periodically sends keep-alive messages 402, 410 and 416 to the shadow system 200 via the backbone network. While operating under normal conditions, shadow system 200 will receive the keep-alive messages from live system 400 before the keep-alive timer expires.

Figure 9:
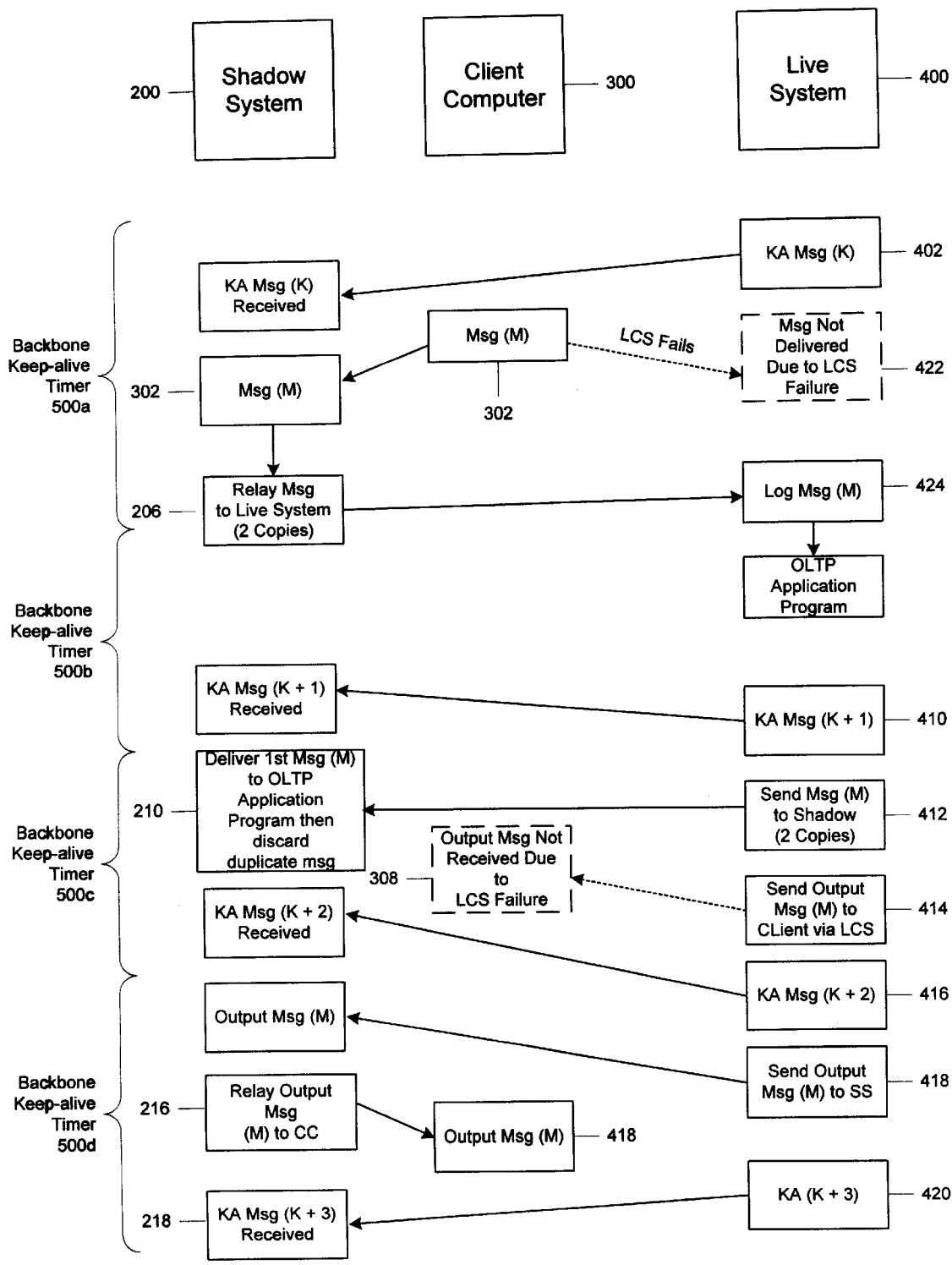
FIG. 9 is a message protocol diagram of the system of the invention when the live communication server fails.

FIG. 9 shows the message flow of the high availability OLTP system of the invention when the live communication server fails. The failure of one, or more, live communication servers does not interrupt the operation of client computers because the client computers are able to communicate with the live OLTP system via the shadow communication servers and backbone network.

The client computer's network manager tries to send a copy of input message 302 to both the live and shadow systems 400 and 200, respectively. Due to the failure of the live communication server and lost TCP/IP connection, live system 400 cannot receive input message 302 as indicated by dotted block 422. The shadow system 200 network manager receives input message 302 via the shadow communication server.

The shadow system network manager queues the input message 302, and relays it (206) to the live system network manager via the backbone network. The live system network manager checks to see if the input message is a duplicate. Since the input message is not a duplicate, the live system network manager logs (424) input message 302 and delivers said input message to the live system application program. The live system network manager then sends two copies 412 of the input message to the shadow system network manager via the backbone network. The shadow system network manager refers to its connection list, determines that the first copy is not a duplicate, and delivers (210) that input message to the shadow application program, so that said shadow network manager can "shadow" the live system. The shadow network manager will detect that the second copy is a duplicate and discard it (not shown on the FIGS.).

The live system 400 sends an output message 414 to the live system network manager. Due to the failure of the live communication server, the live system network manager cannot send the output message directly to client computer 300, as shown by dotted block 308. Since the live system network manager's connection with the shadow system network manager is intact (that is, the backbone network), the live system network manager sends duplicate copies 418 of the output message to the shadow system network manager via the backbone network. The shadow system network manager determines that the first copy of the output message 414 is not a duplicate, removes the corresponding input message from its recovery queue and relays (216) output message 418 to the client computer network manager via the shadow system communication server. The client computer's network manager determines that it is not a duplicate and delivers it to the client application program. When the shadow network manager receives the second copy of the output message, it detects that it is a duplicate and discards it (not shown in the FIGS.).

During the course of operation, and even though the live system communication server has failed, the live OLTP system still sends keep-alive messages 402, 410 and 416 to the shadow OLTP system 200 via the backbone network. Because the shadow system receives keep-alive messages within the keep-alive time intervals 500a–500d, it knows the live OLTP system is operable.

Figure 10:
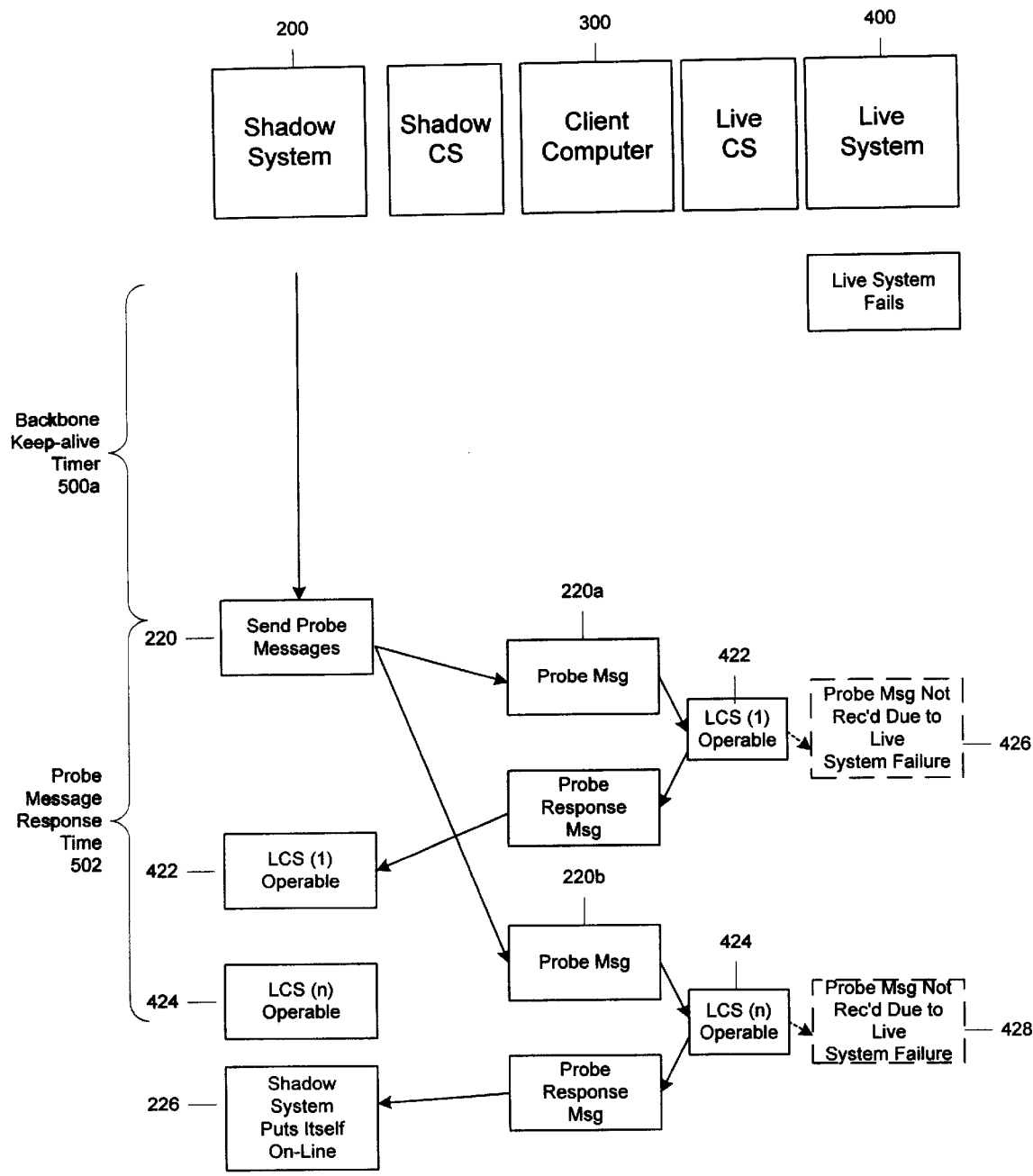
FIG. 10 is a message protocol diagram of the system of the invention when the live system fails.

FIG. 10 shows the operation of the high availability OLTP system of the invention when the live system fails. The failure of the live system does not interrupt the operation of client computers because the shadow system will detect the failure and put itself on-line without operator intervention.

Due to the failure of the live system, the shadow system network manager will not receive a keep-alive message from the live system via the backbone network. When the backbone keep-alive timer 500a expires and has not received a keep-alive message, the shadow system responds by sending probe messages 220 to all live communication servers on its connection list and starting a "probe message response timer" 502. The purpose of the timer 502 is to limit how long the shadow system will wait to receive probe message response messages from client computers.

When the respective client computers network manager receives a probe message 220a and 220b from the shadow system, it relays such messages to the live communication server. The live communication server responds by sending an "I'm operable" probe response message 422 and 424, sent to the shadow OLTP system via the client computers. The shadow system network manager tallies the probe response messages as it receives them. Due to the live system failure, the shadow system 200 will not receive an "I'm on-line" probe response message from the live system 400. Live system 400 does not receive probe messages 220a and 220b, as indicated by dotted blocks 426 and 428, respectively.

When probe message response timer 502 expires, the shadow system 200 analyzes the tally and deduces that the live system has failed, because said shadow system did not receive any probe response messages from the live system, but it did receive probe response messages from the live communications servers indicating that the live OLTP system was reachable. Once the live system failure is determined by the shadow system, said shadow system transitions from "shadowing" to "on-line" mode. The shadow network manager then checks its input message recovery queue to see if there are any unprocessed input messages. In this case, there are none, so the transition is complete. From this point onward, the shadow network manager will send output messages to client computers when it receives input messages from them.

Figure 11:
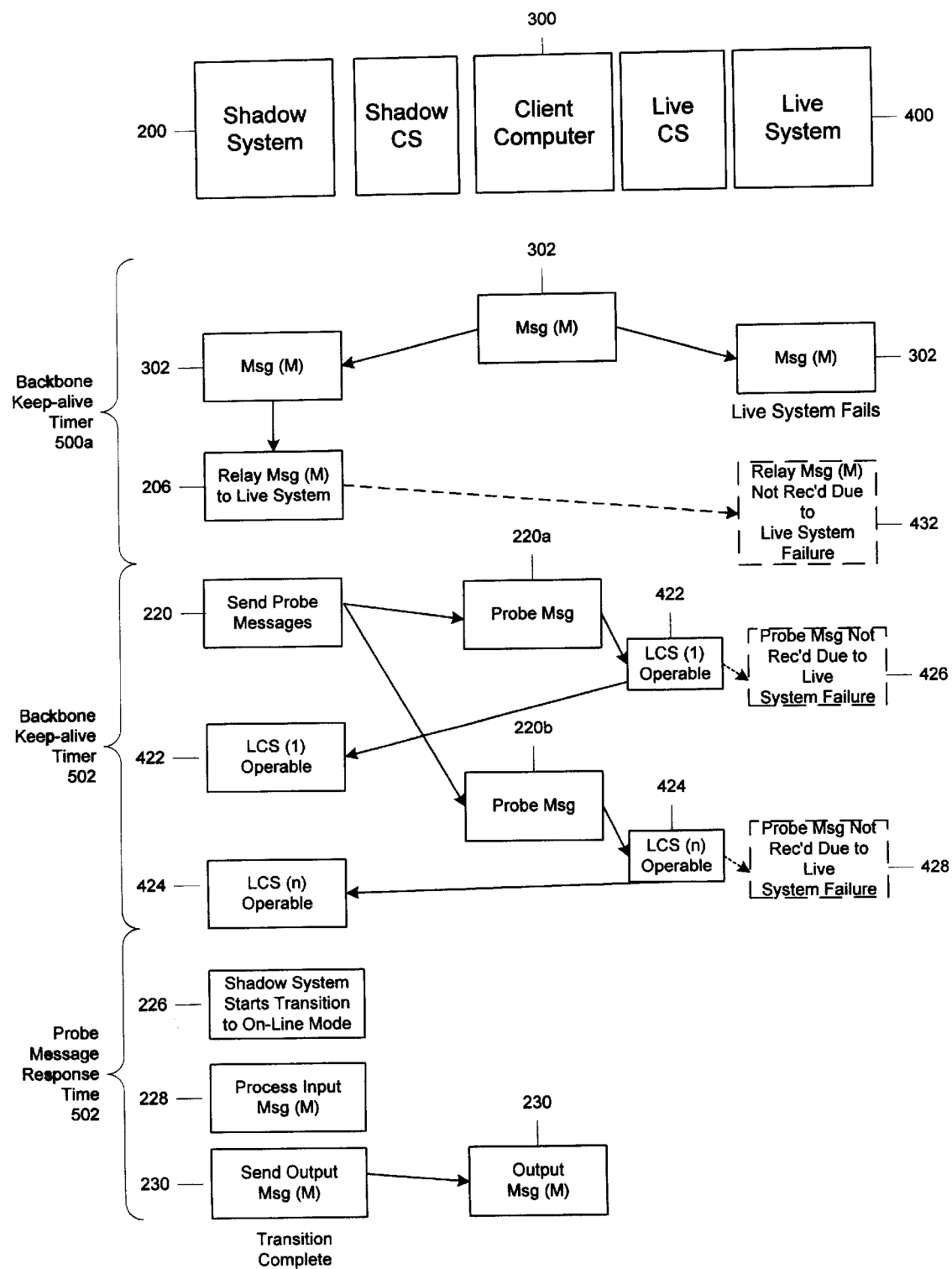
FIG. 11 is a message protocol diagram of the system of the invention when the live system fails after an input message.

FIG. 11 shows the high availability OLTP system of the invention when the live system fails after a client computer provides an input message. The failure of the live system 400 while it is processing an input message from a client computer will not result in the failure to process that client's input message provided that said client can still reach the shadow system.

The client computer network manager sends an input message 302 to the live and shadow systems 400 and 200, respectively, via the live and shadow communication servers. The live system receives input message 302 and fails before it can process an output message. In the meantime, the shadow system network manager queues input message 302 for recovery and attempts to transmit it (206) to the live system via the backbone network. The failure of the live system prevents the receiving of the input message thereto. The shadow OLTP backbone keep-alive timer 500a expires without receiving a keep-alive message from the live OLTP system. The shadow OLTP system responds by sending probe messages 220 to all live communications servers on its connection list and starts the probe response message timer 502. When the client computers network managers receive the probe messages from the shadow system, they relay them to their live communication servers. The live communication server responds with an "I'm operable" probe response message 422 and 424 to it's client. The live system cannot be reached due to it's failure, as indicated by dotted blocks 426 and 428, and thereby cannot not send an "I'm on-line" probe response message to the shadow system.

The client computers relay the probe response messages 422 and 424 to the shadow system via the shadow WAN. The shadow system network manager tallies the probe response messages received and when the probe response message timer 502 expires, analyzes the tally and deduces that the live system has failed, because said shadow system did not receive any probe response messages from the live system, but it did receive probe response messages from live communication servers indicating that the live OLTP system was reachable. Once the shadow system determines that the live system has failed, it starts the transition (226) from "shadowing" to "on-line" mode.

The last step in the transition is to check for any unprocessed input messages. To do this, the shadow system checks its input message recovery queue and, as in this case, finds an unprocessed input message 302. The input message 302 is then sent (228) to the shadow OLTP application program for processing. When the shadow system creates an output message 230, it delivers such message to the shadow network manager, which relays said message to the client computer via the shadow communication server and shadow WAN.

Figure 12:
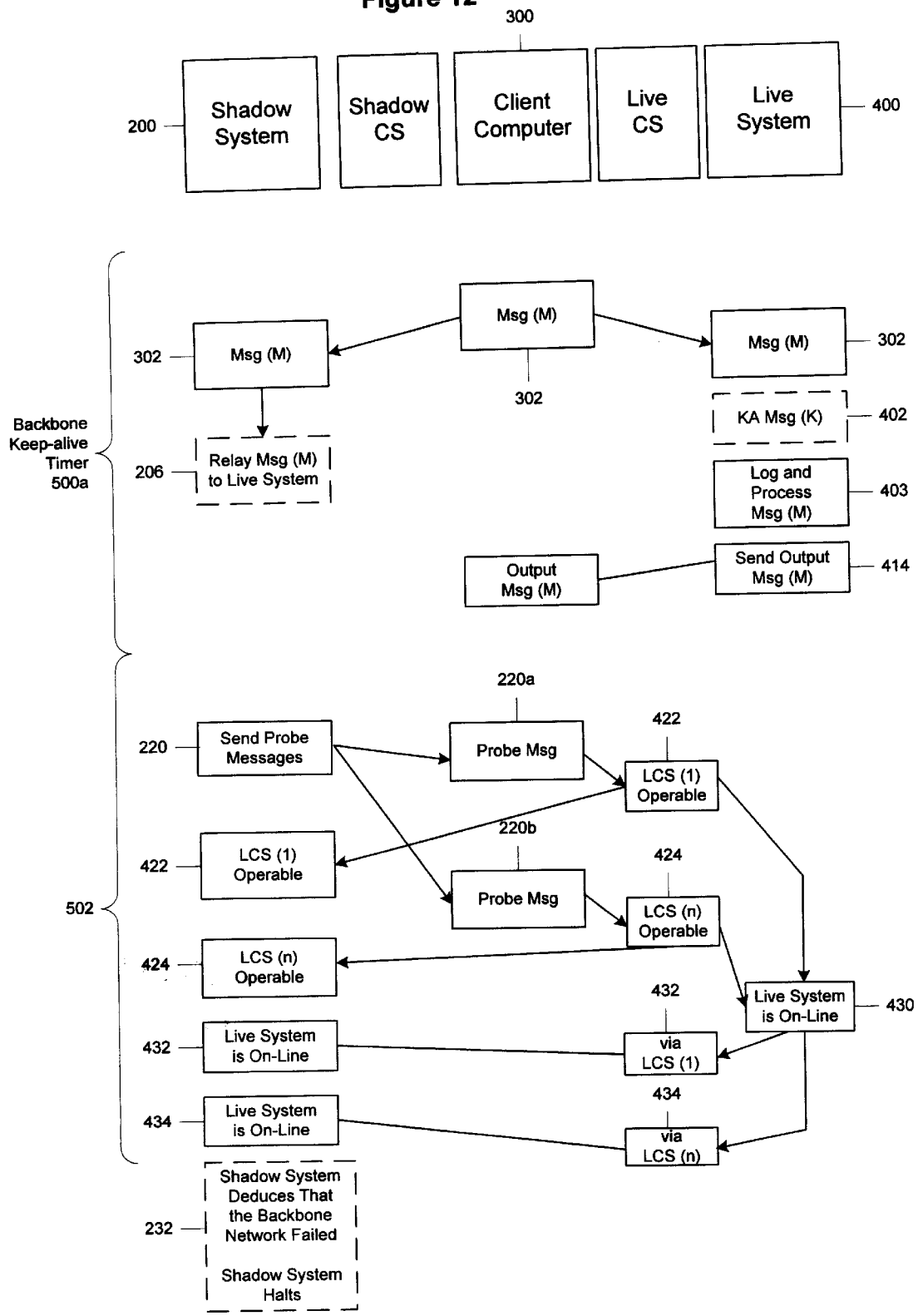
FIG. 12 is a message protocol diagram of the system of the invention when the backbone network fails after an input message.

FIG. 12 shows the high availability OLTP system of the invention when the backbone network fails after the client computer provides an input message to the system. The failure of the backbone network does not interrupt the operation of any client computer which can reach the live system via the live WAN and live communications servers.

The client computer 300 sends an input message 302 to both the live and shadow systems 400 and 200, respectively, via the live and shadow communication servers. The live system network manager checks to see if input message 302 is a duplicate. Since the input message 302 is not a duplicate, the live system network manager logs said input message and delivers said input message to the live OLTP application program for processing. In the meantime, the shadow network manager receives input message 302 from the shadow communication server and queues the message for recovery. At the same time, the shadow network manager attempts to send input message 302 to the live system via the backbone network. The shadow network manager cannot send the input message, due to the lost connection with the live system network manager when the backbone network failed.

The live system will create an output message 414 and send it to the client computer via the live communication server. The client computers' network managers check to see if the output message 414 is a duplicate and if it is not, (as shown) delivers the output message to the client application program.

Live system 400 generates a keep-alive message 402 to send to shadow system 200, but due to the backbone failure, said keep-alive message cannot be sent. The shadow backbone keep-alive timer 500a expires and the shadow network manager checks for a keep-alive message from the live system. When the shadow network manager does not find a keep-alive message, the shadow system responds by sending probe messages 220 to all the live communications servers on its connection list and starts the probe response message timer 502. When a client's network manager receives a probe message 220 from the shadow system, it relays such probe message to its live communication server. The live communication server responds with an "I'm operable" probe response message 422 and 424 to its client. Then, the live communication server relays the probe message to the live system network manager 430 which responds with "I'm on-line" probe response message 432 and 434 to said live communication server, which relays said probe response messages to its respective clients. Client computer 300 relays the probe response messages to the shadow system via the shadow WAN and shadow communication servers. The shadow network manager tallies the probe response messages as they are received.

When the probe response timer 502 expires, the shadow system analyzes the probe response message tally and deduces that the live system is operable, because it received "I'm on-line" probe response messages from it. The shadow system cannot shadow the live OLTP system if it cannot receive the same input stream that the live system is processing. Therefore, the shadow system informs the shadow computer operator it cannot shadow the live OLTP system because the backbone network failed and shuts itself down (232).

A failure of the shadow system, or shadow communication server, does not interrupt the operation of any client computer which can reach the live system via the live network.

While several embodiments of the present invention have been shown and described, it is to be understood that many changes and modifications may be made thereunto without departing from the spirit and scope of the invention as defined in the appended claims.

We claim:

1. A method for maintaining a high availability OLTP system having a live and shadow OLTP system including live and shadow WANs, live and shadow communications servers and remote client computers, said method comprising the steps of:
    a) establishing a connection between the live and shadow OLTP systems;
    b) establishing a direct connection between the client computers and their respective live and shadow communications servers;
    c) appending client computer identification data to the input messages the client computers send to the live and shadow OLTP systems; and
    d) sending probe messages from the shadow OLTP to the live communications servers and live OLTP system via a shadow wide area network (WAN) and the client computers wherein this step comprises the steps of:
        i) maintaining a dynamic connection list in the shadow OLTP system that contains the network addresses of every live communications server that is in session with a client computer and the network addresses of those client computers;
        ii) sending a probe message from the shadow OLTP system to the respective shadow communications servers;
        iii) relaying a probe message from the shadow communications server to the respective client computer;
        iv) relaying the probe messages from the client computer to its live communications server;
        v) returning a live communications server probe response message from the live communications server to the client computer;
        vi) relaying the probe message from the live communications server to the live OLTP system;
        vii) returning a probe response message from the live OLTP system to the live communications server;
        viii) relaying the live OLTP probe response message from the live communications server to the client computer;
        ix) relaying the live communications server probe response message from the client computer to the shadow communications server;
        x) relaying the live OLTP probe response message from the client computer to the shadow communications server;
        xi) relaying the probe response message from the shadow communications server to the shadow OLTP systems;
        xii) monitoring the probe response messages from the live communications servers and live OLTP system, said step of monitoring performed by the shadow OLTP system;
        xiii) determining the live OLTP system failed when probe response messages are received by the shadow OLTP system from the live communications servers but not from the live OLTP system;
        xiv) placing the shadow OLTP system on line to take over the role of the live OLTP system without operator intervention when the shadow OLTP system determines the live OLTP system has failed;
    xv) determining whether there are client computers in current session with live communications servers and having the shadow system send probe messages to the live communications servers and live OLTP system according to said determination.

2. A method for maintaining a high availability OLTP system having a live and shadow OLTP system including live and shadow WANs, live and shadow communications servers and remote client computers, said method comprising the steps of:
    a) establishing a connection between the live and shadow OLTP systems;
    b) establishing a direct connection between the client computers and their respective live and shadow communications servers;
    c) appending client computer identification data to the input messages the client computers send to the live and shadow OLTP systems;
    d) establishing a backbone network between the live and shadow OLTP systems by providing two dedicated communication circuits between the shadow and live OLTP systems;

e) maintaining a keep-alive timer in the shadow system;

f) transmitting keep-alive messages, via the backbone network, periodically from the live OLTP system to the shadow OLTP system, said periodic keep-alive messages being sent before the keep-alive timer in the shadow system expires; and g) sending output messages from the live OLTP system to client computers via the backbone network, shadow OLTP system and shadow communications server to bypass potential live WAN and live communication server faults comprising the steps of:

i) having the live OLTP network manager accept output messages from the OLTP application program;

ii) having the live OLTP network manager create duplicate output messages using the client computer identification data contained in the connection list maintained by the live OLTP system;

iii) having the live OLTP network manager send output messages to the shadow OLTP system via the backbone network;

iv) having the shadow OLTP system relay the output messages to the shadow communications server which relays them to the client computer;

v) having the client computer network manager detect and discard duplicate output messages created by the live OLTP system; and vi) having the client computer network manager pass one copy of the output message to the client computer application program.

* * * * *